United States Patent [19]

Dragonuk

[11] 4,444,085
[45] Apr. 24, 1984

[54] PNEUMATIC LAUNCHER SYSTEM
[75] Inventor: Leo Dragonuk, Plymouth Meeting, Pa.
[73] Assignee: The United States of America as represented by the Secretary of the Navy, Washington, D.C.
[21] Appl. No.: 342,543
[22] Filed: Jan. 25, 1982
[51] Int. Cl.³ ............................ F41F 5/02; B64D 1/04
[52] U.S. Cl. ................................... 89/1.5 R; 89/1.806
[58] Field of Search ............... 89/1.5 R, 1.5 E, 1.5 F, 89/1.818, 1.806; 251/25; 244/137 R

[56] References Cited
U.S. PATENT DOCUMENTS

| | | | |
|---|---|---|---|
| 2,304,841 | 12/1942 | Mikkelsen | 124/73 |
| 2,723,093 | 11/1955 | Price et al. | 89/1.5 R X |
| 2,780,213 | 2/1957 | Colling et al. | 124/67 X |
| 2,925,985 | 2/1960 | MacDavid | 251/25 X |
| 2,955,585 | 10/1960 | Friedland et al. | 251/25 X |
| 3,308,719 | 3/1967 | Myers | 89/1.5 R |
| 3,451,306 | 6/1969 | Lagerstrom et al. | 89/1.5 R |
| 3,547,000 | 12/1970 | Haberkorn | 89/1.5 R |
| 3,689,025 | 9/1972 | Kiser | 251/25 X |
| 3,863,887 | 2/1975 | Stradella et al. | 251/25 |
| 4,026,188 | 5/1977 | Woodruff et al. | 89/1.5 R |
| 4,040,334 | 8/1977 | Smethers, Jr. | 89/1.818 X |
| 4,103,864 | 8/1978 | Hagendorn | 251/63.6 |
| 4,109,894 | 8/1978 | Honda et al. | 251/25 X |
| 4,164,887 | 8/1979 | Ovellette | 89/1.5 R |
| 4,263,835 | 4/1981 | Dragonuk | 89/1.5 R |

Primary Examiner—David H. Brown
Attorney, Agent, or Firm—Robert F. Beers; Henry Hansen

[57] ABSTRACT

A pneumatic launch system for an aircraft for ejecting one at a time a plurality of sonobuoys within each of a multiple array of tubes. A compressed air supply from the aircraft is regulated in a plenum selectively having poppet valves for selectively releasing plenum air to each sonobuoy within a tube. Each poppet valve is held against the outlet port by differential gas pressure across a piston connected to the valve. A quick exhaust valve bleeds the air from one side of the piston causing it to open and allow the plenum air to pass through the port and apply an ejection force to a sonobuoy. When the exhaust valve is closed, the pressure on either side of the piston equalizes and the poppet valve closes. A replenishment poppet valve recharges the plenum when the pressure drops below a regulated level.

13 Claims, 10 Drawing Figures

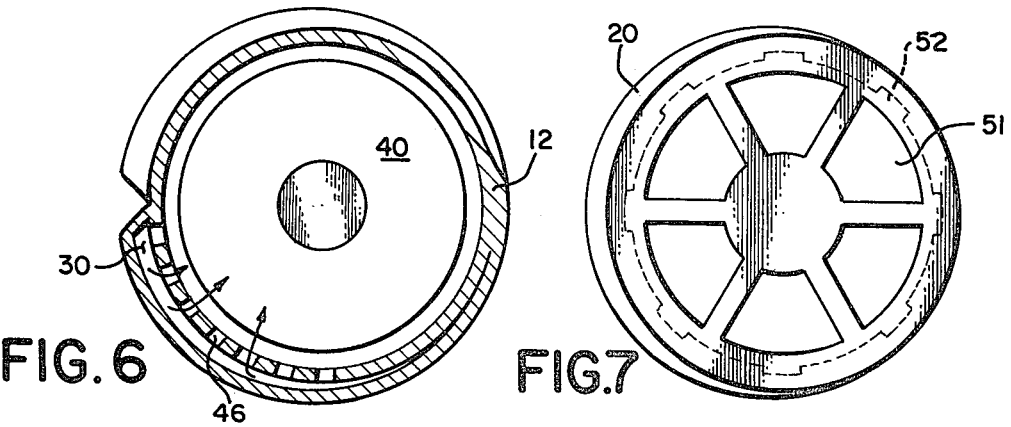
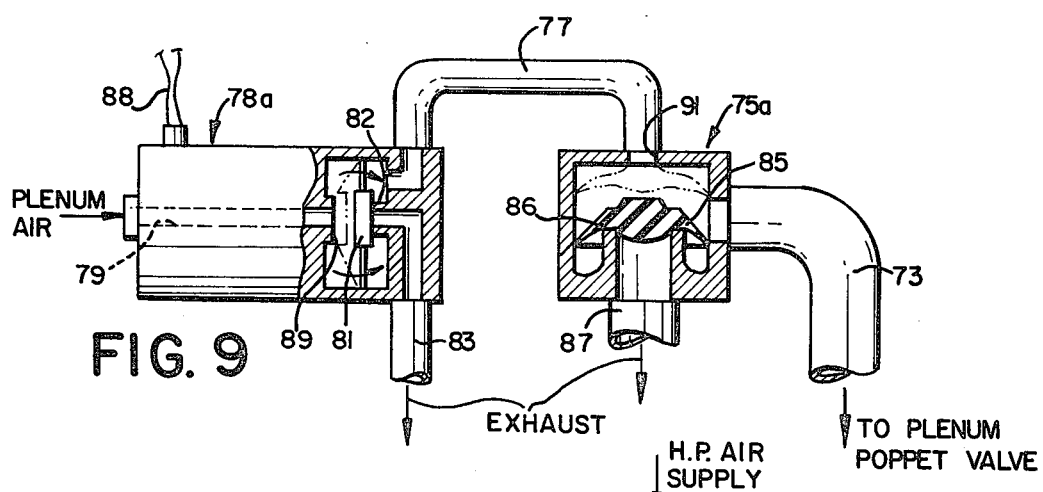
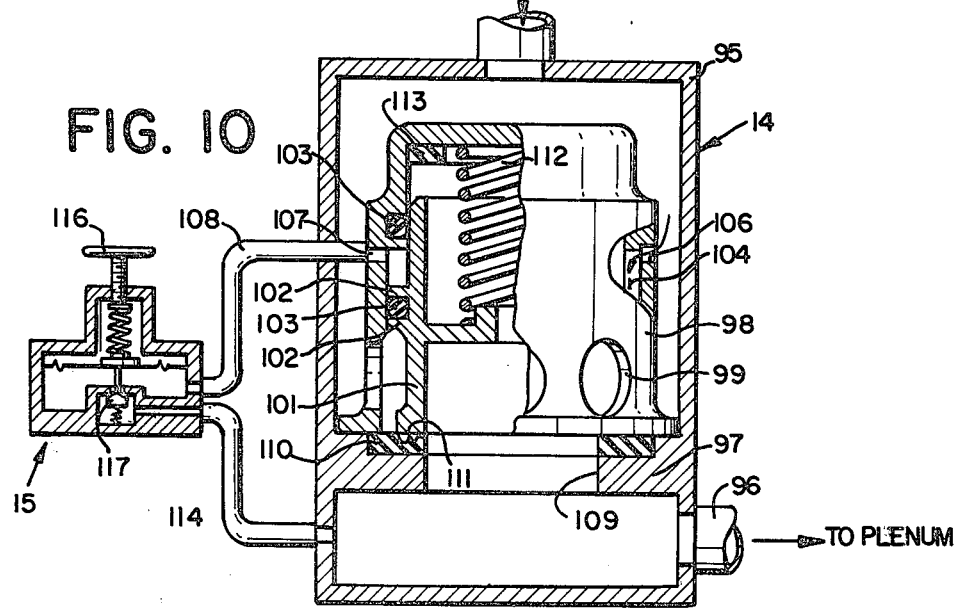

PNEUMATIC LAUNCHER SYSTEM

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates to a pneumatic launcher system and more particularly to such a system for sequentially launching a plurality of stores from a single launch tube.

Anti-submarine warfare (ASW) aircraft eject sonobuoys from a launcher while in flight for deployment in the ocean at selected locations. The launcher generally consists of a nest of tubes located in the aft end of the fuselage; and each sonobuoy is packaged in its own shipping container which is loaded with the sonobuoy in the launcher prior to flight and then performs as a launch tube. The sonobuoy is ejected by sudden energy released from a pyrotechnic or high pressure gas cartridge at the inboard end of its container. Being explosive in nature, the containers are inherently dangerous and require extremely careful handling in shipping, storage and loading. In addition, the power output levels between cartridges varies considerably, propellant contaminants are obnoxious and corrosive, and inadvertent firing is difficult to control. Furthermore, very complex breech and firing mechanisms within each container are required to accommodate the high reactive forces involved. Consequently, the cost for each container is relatively high, particularly since they are usually not recycled.

SUMMARY OF THE INVENTION

Accordingly, it is an object of the present invention to provide a sonobuoy launcher system utilizing a safe, quick-acting, high capacity pneumatic ejection force. Another object is to provide a launcher system capable of a plurality of sonobuoys in a single shipping and launching tube containing no hazardous explosive energy components. A further object is to provide a launcher system in which a plurality of sonobuoys within a single tube can be ejected one at a time. A still further object is to provide a launcher system which will operate from existing energy sources developed within the aircraft, which is relatively simple to install and load, and which is inexpensive to manufacture, operate and repair. Still another object is to provide a high capacity, quick acting gas operated valve which is reliable, simple to manufacture and repair.

Briefly, these and other objects of the invention are accomplished by a sonobuoy launcher system having a plenum charged from a readily available aircraft pressurized air supply and to which a plurality of shipping and launching tubes can be quickly and removably connected at their breech ends. Each tube contains a plurality of sonobuoys inserted in tandem with discrete air passages between the plenum and the inboard end of each sonobuoy. A quick acting, high capacity poppet valve in each passage selectively operates to eject the sonobuoys one at a time. The poppet valves are held closed initially by the plenum air pressure, opened by electrically energized pilot valves, and automatically closed after ejection of the sonobuoys to prevent additional air from escaping out of the plenum. Another quick acting, high capacity poppet valve and pressure regulator automatically recharges the plenum after each sonobuoy launching.

For a better understanding of these and other objects and aspects of the invention, reference may be made to the following detailed description wherein:

BRIEF DESCRIPTION OF THE DRAWINGS

FIGS. 4, 5 and 6 are transverse cross-sections of the launch tube of FIG. 2 taken at the line of 4—4, 5—5 and 6—6 respectively;

FIG. 7 is an end view of the launch tube of FIG. 2 taken along the line 7—7;

FIG. 9 is a cross-sectional view of a pilot valve and quick exhaust valve shown in FIG. 2; and FIG. 10 is a cross-sectional view of a regulating valve and replenishment poppet valve shown in FIG. 1.

DESCRIPTION OF THE PREFERRED EMBODIMENT

Figure 1:
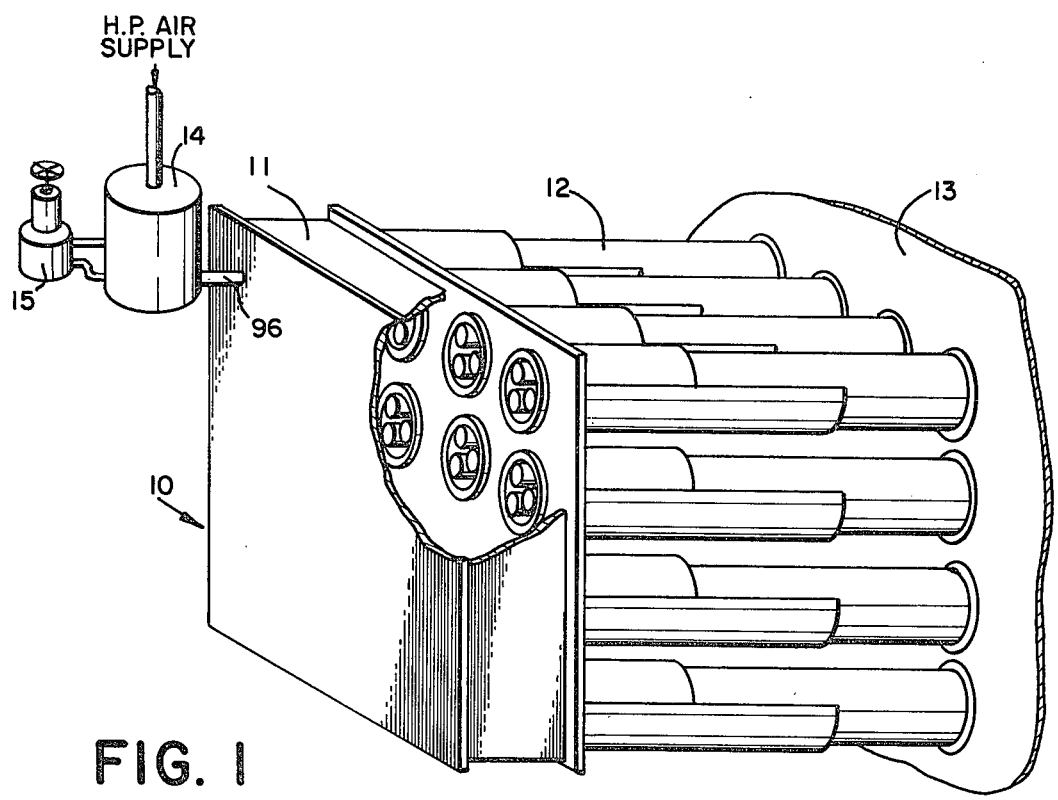
FIG. 1 is an isometric view from within an aircraft of a sonobuoy launcher system having a plurality of launcher tubes according to the invention.
Figure 2:
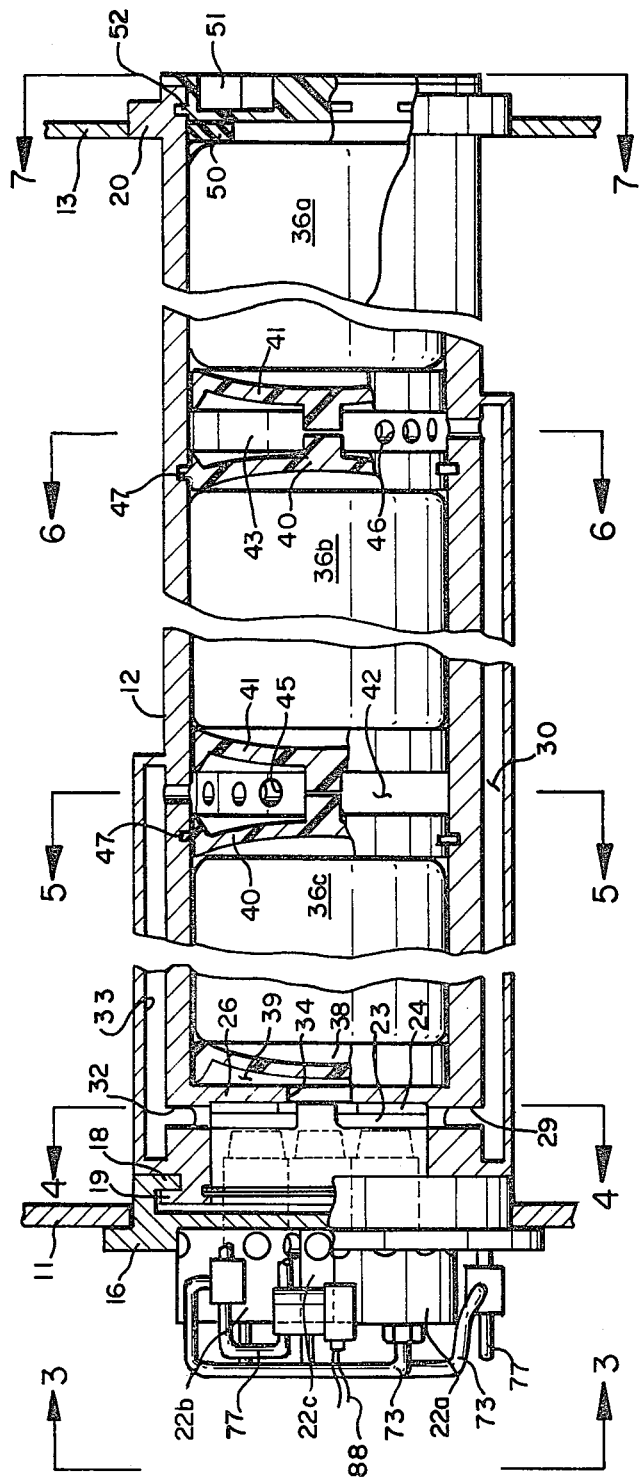
FIG. 2 is a longitudinal view, partially in cross-section, of one launcher tube and control valves therefor within the launcher system of FIG. 1, the tube being shown with tandem loaded sonobuoys ready for launch.
Figure 5:
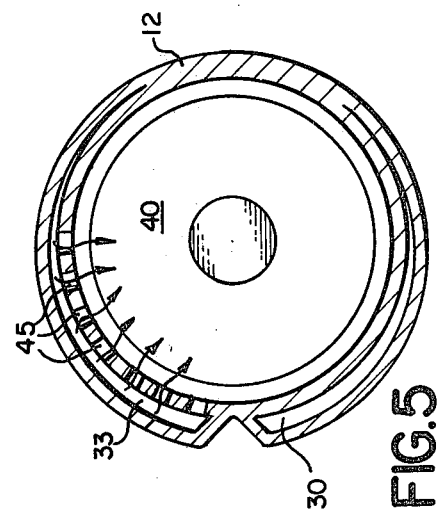

Referring now to the drawings wherein like characters designate like or corresponding parts throughout the several views, there is shown in FIG. 1 a sonobuoy launcher system 10 having an air plenum 11 connected at the breech ends of the plurality of generally cylindrical launch tubes 12. The discharge ends of the tubes extend through corresponding openings in the fuselage 13 of an ASW aircraft. Air pressure within plenum 11 is supplied from a storage tank or the aircraft compressor through a replenishment poppet valve 14 and pressure regulator 15. As shown in FIG. 2, tube 12 is secured to a breech block 16 affixed to the plenum 11. Four lugs 18 in block 16 extend inwardly for rotational locking engagement with corresponding lugs 19 extending outwardly from the breech end of tube 12. The discharge end of tube 12 is secured by a boss 20 on the end of tube 12 which slidingly registers with fuselage opening.

Figure 8:
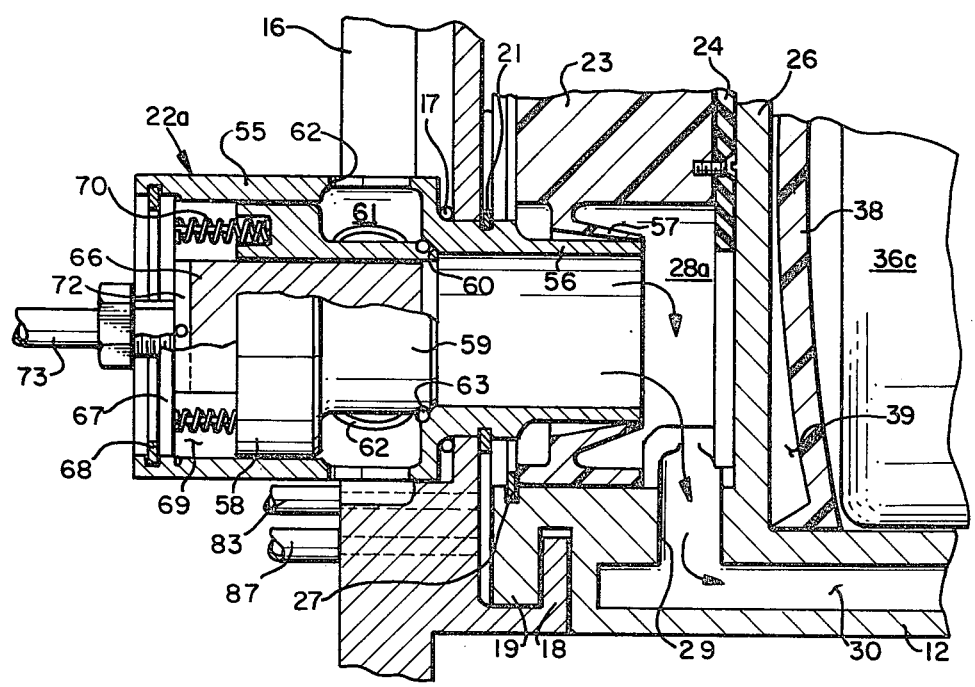
FIG. 8 is a longitudinal view, partially in cross-section of a poppet valve shown in FIG. 3 taken along the line 8—8.
Figure 4:
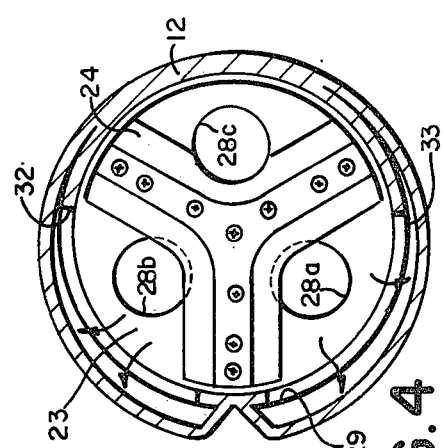

Plenum air to the breech end of tube 12 is controlled by each three plenum poppet valves 22a, 22b and 22c which, as shown in FIG. 8, are secured in breech block 16 with O-ring seals 17 and lock rings 21. Outlet air from each valve is diverted into a discrete path by a breech manifold 23 and a manifold seal 24 secured in the breech end of tube 12 against a tube partition 26 by a lock ring 27. As shown in FIG. 8, the outlets of valves 22a, 22b and 22c sealingly extend into corresponding cavities 28a, 28b, 28c which divert the plenum air into discrete chambers within tube 12. As illustrated by the air flow arrows in FIGS. 4 and 8, the air from valve 22a travels outwardly through cavity 28a and a peripheral slot 29 in tube 12 to an enclosed channel 30 longitudinally extending along the outer surface of tube 12. Similarly, plenum air from valve 22b passes through cavity 28b and a peripheral slot 32 into an enclosed channel 33 also extending along the outer surface of tube 12. The plenum air from valve 22c, however, passes through cavity 28c and an opening 34 in partition 26 to a chamber described infra. Manifold seal 24 provides a seal between the interface of manifold 23 and partition 26 thus ensuring pressure integrity within the respective cavities.

Launcher tube 12 is shown loaded with three dwarf-type sonobuoys designated, in order of ejection, as 36a, 36b, and 36c. A pliable obturator 38, sealingly positioned at the breech end of tube 12 between partition 26 and sonobuoy 36c, forms a first chamber 39 for receiving the plenum air from valve 22c via manifold 23 and opening 34. Two pairs of opposed obturators 40 and 41, sealingly interposed between sonobuoys 36c, 36b and 36a, form second and third chambers 42 and 43 which communicate with channels 33 and 30 respectively through adjacent holes 45 and 46. Obturators 40 include radial shear tabs 47 which extend into corresponding recesses in tube 12 for retaining sonobuoys 36b and 36c in the tube under normal shipping and loading conditions, but which shear off when plenum air pressure reaches chambers 39 and 42 to allow the respective sonobuoy to eject.

Sonobuoy 36a is retained in the tube 12 by a resilient pad 50 compressively interposed between sonobuoy 36a and a breakout cap 51. A plurality of shear tabs 52 extend from cap 51 into corresponding recesses at the discharge end of tube 12 and hold the sonobuoy 36a in position under normal prelaunch loading, but which shear off and release sonobuoy 36a when plenum air pressure is applied to the third chamber 43.

Referring now to the details of the plenum poppet valve 22a of FIG. 8, which is identical to valves 22b and 22c, there is shown a cylinder 55 within plenum 11 with a reduced diameter section 56 extending from one end of cylinder 55 through breech block 16 into a slightly resilient conical extension 57 of manifold 23 within cavity 28a. The section 56 and extension 57 are sized to provide a snug fit and a positive seal between cavity 28a and the external environment. A double acting piston 58, slidable within cylinder 55 includes a reduced diameter section 59 and an O-ring seal 63 to form a valve element which seats against an annular shoulder 60 within cylinder 55 to form an annular chamber 61 at one face of piston 58. Openings 62 in cylinder 55 provide a passage for plenum air to chamber 61. The other end of cylinder 55 is closed with a flange 67 secured by a locking ring 68. A piston guide 66 affixed to flange 67 slidably extends through the center of piston 58 and, together with flange 67, forms an annular chamber 69 at the other face of piston 58 opposite of chamber 61. Guide 66 includes a plurality of radial bleed holes 72 adjacent to the flange 67 which communicate between chamber 69 and a conduit 73. A plurality of compression springs 70 between flange 67 and piston 58 urge section 59 to a closed position against shoulder 60 when the pressure in chamber 69 is equal to the plenum pressure in chamber 61. In addition, the larger piston area at chamber 69 than at chamber 61 maintains positive closure when the pressures are equal.

Figure 3:
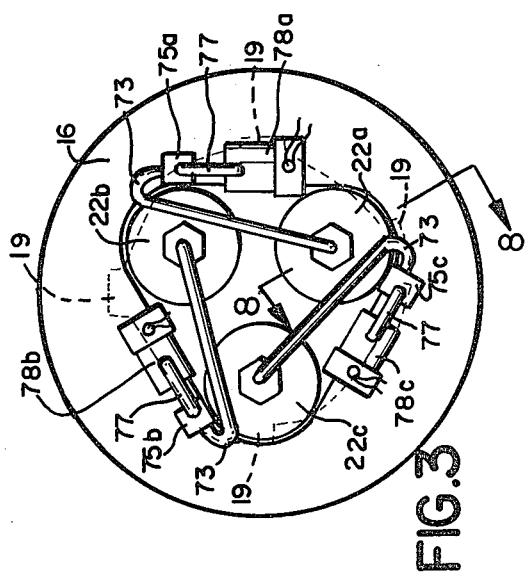
FIG. 3 is an end view of the control valves of FIG. 2 taken along the line 3—3.

As shown in FIG. 3, each of plenum poppet valves 22a, 22b and 22c is connected by a conduit 73 to a respective three-way quick exhaust valve 75a, 75b or 75c which, in turn is connected by a conduit 77 to a respective solenoid operated pilot valve 78a, 78b or 78c. Each of these valve combinations operate in the same manner. Referring to FIG. 9, pilot valve 78a is normally deenergized permitting plenum air to flow through a central passage 79, conduit 77, exhaust valve 75a, conduit 73 and bleed holes 72 to the poppet valve chamber 70. A valve element 81 in pilot valve 78a, urged against a valve port 82, prevents flow through an alternate port to an exhaust conduit 83 and to a low pressure region outside of plenum 11 as shown in FIG. 8. Similarly, the relatively high plenum air pressure in conduit 77 urges a valve element 85 in exhaust valve 75a against port 86 to also prevent flow through an alternate port to an exhaust conduit 87 and to the low pressure region shown in FIG. 8. When electrical energy is applied to terminals 88 of pilot valve 78a, valve element 81 moves against an opposite port 89 to close off the flow of plenum air in passage 79 and quickly exhausts the air from valve 75a through conduit 77 and 83. Consequently, valve element 85 moves against a valve port 91 and connects chamber 69 of plenum poppet valve 22a to the low pressure region through exhaust conduit 87, bleed holes 72, and conduit 73. The pilot valve 78a is used in addition to valve 75a in order to obtain the desired exhaust flow capacity with commercially available valves. However, a single solenoid valve of sufficient flow capacity may be used instead.

Each time a plenum poppet valve passes air to the breech end of tube 12, there is a sudden reduction in air pressure within plenum 11. Replenishment valve 14 and regulator 15 operate at these occurrences to quickly recharge the system. Referring to FIG. 10, valve 14 includes a sealed housing 95 connected to receive the unregulated aircraft high pressure air supply, and connected to pass regulated low pressure air via conduit 96 to plenum 11. A partition 97 within the housing supports a valve cylinder 98 with openings 99 therein for passing the high pressure air to within the cylinder. A cylindrical valve element 101 slides within cylinder 98 on spaced annular bosses 102. O-ring seals 103 provide pressure integrity between the sliding surfaces. A reduced diameter section of cylinder 108 and bosses 102 form an annular chamber 104 having an inlet orifice 106 communicating with the high pressure air supply within housing 95, and an outlet orifice 107 communicating through conduit 108 to pressure regulator 15. The sizes of the orifice openings are selected to produce a reduction in pressure within chamber 104 with air flow through conduit 108 to regulator 15. Partition 97 includes a port 109 faced with an annular seal 111 for seating valve element 101. A compression spring 112 between element 101 and cylinder 98 urges the element to a closed position against the seal 111. A bumper 13 affixed to the end of cylinder 98 cushions the valve against harmful impact. A conduit 114 connects the low pressure side of the poppet valve 14 to the regulator which is adjustable at screw 116 for the desired air plenum pressure.

Thus, a valve element 117 in regulator 15 is balanced in the closed position at the desired plenum air pressure, no air is bled through orifices 106 and 107, and spring 112 holds valve element 101 closed around port 109. A sudden drop in plenum air pressure appears in conduit 114 causing element 117 to open and bleed air through orifice 107 at a faster rate than through orifice 106. The pressure in chamber 104 therefore drops causing the high pressure air passing through opening 99 to lift element 101 against the opposing force of spring 112. Air quickly flows through port 109 to conduit 96 and to plenum 11 until the desired pressure is restored and regulator valve element 117 closes. Pressure in chamber 104 then rebuilds to allow spring 112 to close port 109 in addition to the force developed by the differential area between the upper and lower bosses 102.

Operation of the invention is summarized as follows. Sonobuoys 36a, 36b, and 36c are preferably loaded before shipping and storage with the obturators and break-out cap in each tube 12 as shown in FIG. 2. It is contemplated, however, that tube 12 may also be used for a single full length sonobuoy, in which case only obturator 38 and break-out cap 51 are required for storage, and only plenum poppet valve 22c for launching. Prior to an ASW aircraft mission, the pre-loaded tubes 11 are installed on the ground in the launcher system 10 by inserting the breech ends through the fuselage openings and locking them in lugs 19 in the breech block 16. During initial flight, the launcher plenum 11 is charged with air from the aircraft engine compressor through replenishment poppet valve 15 and regulator 16 to a desired plenum pressure, typically 50–60 psi. The system is now in "ready" condition. When the aircraft reaches an ocean area of interest, selected sonobuoys may be ejected one at a time from the launch tubes 12 through a switch arrangement, not shown, connected to the associated terminals 88 of the launcher system. The switches are electrically arranged for each tube 12 to insure that sonobuoys 36a, 36b and 36c are ejected in proper order.

Prior to sonobuoy ejection, the plenum air pressure passes through pilot valves 78a, 78b, 78c and quick exhaust valve 75a, 75b, 75c to the chambers 69 of each plenum poppet valve 22a, 22b, 22c. Plenum air pressure is also applied within chamber 61 through holes 62 of valve 55. The differential force produced on piston 58 due to the differences in areas on either side, coupled with the force of spring 70, holds valve 55 in the closed position shown FIG. 8 thereby preventing plenum air from entering the manifold chambers 28a, 28b and 28c. To launch sonobuoy 36a, pilot valve 78a is energized causing immediate exhaust of the air within poppet valve chamber 69. The plenum pressure in chamber 61 now pushes piston 58 against the force of springs 70 to open the port at shoulder 60 and allows plenum air to pass through the manifold 23 to the third chamber 43 via slot 29 and channel 30. The plenum pressure applied against obturator 41 exerts an ejection force through sonobuoy 36a which shears tabs 52 and releases cap 51. Sonobuoy 36a is then free to eject from tube 12. Tabs 47 and obturators 40 will retain sonobuoys 36b and 36c in the tube 12. Similarly, energizing pilot valves 78b and 78c will produce a plenum pressure at chambers 42 and 39 to break the respective shear tabs 47 and eject sonobuoys 36b and 36c.

After each operation of a plenum poppet valve, the drop in plenum air pressure is sensed by regulator 15 which allows replenishment poppet valve 14 to recharge plenum 11 for subsequent launching operations.

Some of the many advantages of the present invention should now be apparent. For example, a pneumatic launcher system is provided which enables a high density loading of sonobuoys within a relatively small space. A plurality of sonobuoys can be stored within a single launching tube, but ejected one at a time. The launcher system will operate from an existing energy source developed from within the aircraft obviating a requirement for hazardous and explosive pyrotechnic or gas cartridges. The system utilizes valves which are high capacity and quick acting to insure sufficient force for rapid ejection of the sonobuoy. A relatively simple launcher is provided which is easy to load and install within a launcher system, which is inexpensive to manufacture, operate and repair, and which is safe and reliable.

It will be understood that various changes in the details, steps and arrangement of parts, which have been herein described illustrated in order to explain the nature of the invention, may be made by those skilled in the art within the principle and scope of the invention as expressed in the appended claims.

What is claimed is:

1. A pneumatic launcher system for ejecting stores comprising, in combination:
   plenum means formed to receive a charge of compressed gas;
   a plurality of tubes, each formed to receive a plurality of the stores in spaced relation along the length thereof and having a breech end connected to said plenum means and a discharge end, said tubes each including passages communicating between said breech end and the end of each store facing said breech end; and
   first valve means connected to said plenum means and said tubes for selectively controlling flow of the gas to said passages.

2. A pneumatic launcher system according to claim 1 wherein said first valve means comprises:
   a plurality of valve bodies each having an inlet port communicating with said plenum means and an outlet ports interconnected by an orifice;
   a piston slidable in each of said bodies and having a projection seating on said orifice for closing thereof and one side of said piston communicating with said plenum means; and
   control valve means operatively connected between the other side of said piston, said plenum and the exterior of said plenum means for selectively applying and exhausting plenum gas pressure from said other side.

3. A pneumatic launcher system according to claim 2 wherein said first valve means further comprises:
   a manifold connected to said outlet ports for directing the gas flow to respective ones of said passages.

4. A pneumatic launcher system according to claim 1 further comprising:
   first obturator means slidable along the length of each of said tubes and positioned at selected ends of the stores for transferring an ejection force to the store when plenum gas pressure is transmitted through said passages.

5. A pneumatic launcher system according to claim 4 further comprising:
   shear tabs radially extending from selected ones of said obturators into each of said tubes for retaining the adjacent store within said tube until said ejection force is applied.

6. A pneumatic launcher system according to claim 5 further comprising:
   cap means positioned at said discharge end having radial shear tabs extending into each of said tubes for retaining the adjacent store within each of said tubes until said ejection force is applied.

7. A pneumatic launcher system according to claim 6 further comprising:
   second valve means formed to be connected to a pressurized gas supply and connected to said plenum means for regulating the gas pressure within said plenum means.

8. A pneumatic dispenser for sequentially ejecting a plurality of stores comprising, in combination:
- a plenum of compressed gas;
- a tube formed to receive the stores in spaced relation along the length thereof and having a breech operatively connected to said plenum and a discharge end, said tube including passages formed to communicate between said breech and the breech end of each of the stores; and
- first valve means connected to said plenum and said tube for selectively controlling flow of the gas to said passages.

9. A pneumatic dispenser according to claim 8 wherein said first valve means comprises:
- a plurality of valve bodies each having an inlet port communicating with said plenum and an outlet ports interconnected by an orifice;
- a piston slidable in each of said bodies and having a projection seating on said orifice for closing thereof and one side of said piston communicating with said plenum; and
- control valve means operatively connected between the other side of said piston, said plenum, and the exterior of said plenum, for selectively applying and exhausting plenum gas pressure from said other side.

10. A pneumatic dispenser according to claim 9 wherein said first valve means further comprises:
- a manifold connected to said outlet ports for directing the gas flow to respective ones of said passages.

11. A pneumatic dispenser according to claim 8 further comprising:
- first obturators slidable along the length of said tube for positioning at the breech end of each of the stores for transferring an ejection force thereto when the plenum gas pressure is transmitted through said passages.

12. A pneumatic dispenser according to claim 11 further comprising:
- second obturators slidable along the length of said tube and positioned at the discharge end of each of the stores and including shear tabs radially extending therefrom into said tube for retaining the stores within said tube until the ejection force is applied.

13. A pneumatic dispenser according to claim 12 further comprising:
- second valve means formed to be connected to a pressurized gas supply and connected to said plenum for regulating the gas pressure therein.

* * * * *